Sept. 3, 1957 A. BRANDSTETTER ET AL 2,805,287

TOLL LINE SWITCHING FOR PREFERRED SUBSCRIBERS IN TELEPHONE SYSTEMS

Filed Sept. 14, 1953 2 Sheets-Sheet 1

Inventors.
Alois Brandstetter, &
Walter Rufer.
By [signature] Atty.

Inventors.
Alois Brandstetter &
Walter Rufer.
By [signature] Atty.

United States Patent Office 2,805,287

Patented Sept. 3, 1957

2,805,287

TOLL LINE SWITCHING FOR PREFERRED SUBSCRIBERS IN TELEPHONE SYSTEMS

Alois Brandstetter and Walter Rufer, Munich, Germany, assignors to Siemens & Halske Aktiengesellschaft, Munich, Germany, a corporation of Germany Application September 14, 1953, Serial No. 379,982

Claims priority, application Germany January 9, 1953

2 Claims. (Cl. 179—27)

This invention relates to signaling or telecommunication systems and is particularly concerned with telephone systems comprising circuit means for switching trunks or toll lines to special or preferred subscribers. The trunk or toll lines may be of substantial length and may include amplifiers if desired. The trunk or toll lines terminate in exchange operators' positions at both ends. It should be understood that the term "trunk or toll lines" is intended to include physical trunk lines and also carrier frequency lines and radio links.

It is known to provide circuit means for switching such lines from their normal connections to preferred subscribers at both ends, such switching-over being effected automatically upon the transmission of special criteria by a calling preferred subscriber and evaluation of these criteria in switch-over apparatus.

In systems of this type, it is necessary to insure traffic between the preferred subscribers under all circumstances, even in the event of non-functioning of the switch-over apparatus at either end of the line, for example due to failure of the current supply therefor, failure of the sound frequency generators, amplifiers or receivers required for transmitting the criterion, or for any other causes.

In accordance with the present invention, this is accomplished by providing the operators' positions with switching means which indicate any non-functioning of the switch-over apparatus and which, upon being actuated by the toll operator, maintain the toll line switched through to the preferred subscriber while simultaneously connecting an emergency current supply into the circuit for this preferred subscriber.

This arrangement has the advantage that the preferred subscribers can establish connections between each other, during breakdowns of the switch-over apparatus, by performing the same steps as they would carry out during normal functioning. These steps comprise lifting of the receiver and thereafter performing some further manipulation which has the effect of switching-over of the toll line and completion of the connection between the preferred subscribers. Thus, according to the invention, in the event of failure of the switch-over apparatus, the preferred subscribers need not supplement the above-mentioned normal procedural steps by any special operations such as calling the operator by inductor, nor need they have to be provided with different apparatus such as central-battery or local-battery apparatus.

In accordance with a further feature of the invention, the circuit arrangement is such that, if the operator should fail to notice the trouble signal at the exchange and to establish the continuous connection of the toll line to the preferred subscriber, a call initiated by the latter will get through to the operator's position at the adjacent end of the line. The exchange operator can then converse with the preferred subscriber and thereafter effect the necessary switching of the toll line through to this subscriber. The latter then repeats the usual second step which starts transmission of the ringing current over the toll line to the preferred subscriber at the other end.

The invention will hereinafter be described with reference to the accompanying drawings in which.

Figure 1:
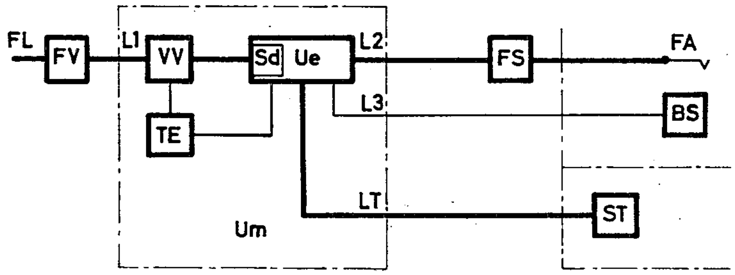
Fig. 1 is a block diagram schematically illustrating the incorporation of the improved switch-over apparatus in a toll line.

As will be seen from Fig. 1, the switch-over apparatus U*m* is inserted in the toll line FL between the terminal amplifier, sound frequency ring converter and the like, which together are designated FV in the drawing, and a relay repeater FS (if any) located at the end of the line. VV designates the pre-amplifier for amplifying the incoming sound frequency modulated signals; TE is the sound frequency signal receiver; and S*d* is the sound frequency signal transmitter; all of these are part of the switch-over apparatus U*m*. A link LT serves to connect the special or preferred subscriber ST to the apparatus U*m*. An auxiliary service unit BS is located at the operator's position in the toll exchange FA and is connected with the switch-over apparatus U*m* over a link L3.

Fig. 1 illustrates the equipment of only one end of the toll line; the arrangement at the other end of the line is exactly the same as that illustrated and has not, therefore, been separately shown.

The manner in which normal connections are made in toll traffic to or from the toll exchange FA, is well known and is not required for an understanding of the present invention; therefore, it will not be particularly described. In these normal connections, the apparatus U*m* directly connects links L1 and L2 with each other and does not perform any special function.

The steps involved in establishing a connection between the preferred subscribers will now be described with reference to Fig. 2.

During idle periods, the relays S and AL in the apparatus U*m* are continuously energized provided the apparatus is ready to be seized. The energizing circuit for relay S extends over the closed contacts 1*s* and 2*a*1 and the conductor 1 to service unit BS (Fig. 3) and key contacts TUII and TAI. The circuit for relay AL is closed over contacts of relays that control the availability of the current supply for the switch-over apparatus, of the sound frequency generator TG, the sound frequency receiver TE and other apparatus components. These contacts are symbolized in the drawing by the single contact *ux*, which is closed as long as the apparatus is ready to be seized.

Seizure of the switch-over apparatus and switching-over of the toll line are accomplished when the preferred subscriber ST lifts his receiver and momentarily depresses the key AT at his station. When he lifts his receiver, relay A in the switch-over apparatus is energized over the subscriber's loop by way of closed contacts 4*s* and 5*s* of the relay S. Relay A1 (bottom center of Fig. 2) is operated by closure of contact 6*a* of relay A.

To indicate that the equipment is ready to be seized for normal operation, the preferred subscriber receives the dial tone WZ over the closed contact 9*a*, repeater U1 and actuated contacts 13*a*, 14*a*.

Depression of key AT operates the relay E over the contact 15*a*1 which has been actuated upon energization of relay A1. Relay E closes its contact 19*e* to establish a holding circuit for itself. Contact 20*e* disconnects the control conductor *i* coming from the sound frequency receiver TE. Contact 21*e* closes a circuit for winding I of relay B, and the latter closes its contact 23*b*. As contact 22*e* has already been closed, relays T and T1 are now operated with some delay. Contacts 27*t* and 28*t* switch the toll line over to the calling preferred subscriber. Contact 10*t*1 connects the busy tone BZ to repeater U1 which in turn transmits the busy tone over contacts 11*t*, 12*t* to the cut-off portion of the toll line, leading to the toll position. At the same time, the busy lamp BL1 associated with the toll line is operated at the toll position by closure of contact 31*t*1 in apparatus U*m*. This lamp indicates seizure of the toll line in general. Seizure by the preferred subscriber in particular is indicated in addition by a busy lamp BL2 in the service unit BS likewise located at toll position, which lamp is operated by closure of contact 32*t*.

Relay B1, by actuating its contacts 33*b*1 and 34*b*1, transmits a sound frequency signal, indicating seizure of the switch-over apparatus, to the other end of the toll line. This seizure signal is generated in the sound frequency generator TG; the length of the seizure pulse is determined by two condensers C1 and C2 co-operating with a relay V. During idle periods, these condensers are charged over contact 37*e* and contacts 39*c*, 40*b* respectively. Upon seizure, the condensers are connected in parallel over contacts 37*e* and 38*a*1. Upon operation of relay B, the parallel condensers are discharged through the winding of relay V so that the latter is maintained energized by the discharge current for a well-defined interval.

In the meantime, relay T1 has disconnected winding I of relay B at contact 35*t*1, but relay B remains energized by its winding II for a period of time governed by contact 36*v* of relay V. Relay B has opened the circuit for relay A1 at contact 7*b*, but relay A1 is maintained operative for the time being over contact 73*b*1.

Upon release of relay V, relay B likewise deenergizes. The contact 40*b* of the latter connects the condensers C1, C2 for recharging. As contact 23*b* opens, relay B1 is denergized, shifts its contacts 33*b*1, 34*b*1 and thus terminates the transmission of the seizure signal pulse.

In the switch-over apparatus at the other end of the line, the seizure signal pulse is transmitted through the preamplifier VV (Fig. 1) to the sound frequency receiver TE, and after rectification, the pulse is transmitted over contact 41*i* (Fig. 2) to the relay repeater unit U*e* (Fig. 1) of the switch-over apparatus U*m*. In the latter, the relay B (winding I) is energized, and after some delay, the relay D is operated. Contact 40*b* connects the charged condenser C2 to relay V, and when relay D operates, its contact 45*d* also connects the charged condensers C3 and C4 to the relay V, the latter remaining in operation until the three condensers have been discharged. The energizing circuit for winding I of relay B has been opened at contact 42*d* but relay B is maintained operative by its winding II under the control of contact 36*v*.

Closure of contact 25*d* energizes relays T and T1 which, as already described, switch the toll line over to the preferred subscriber and light the busy lamps. Opening of contact 17*t*1 blocks the switch-over apparatus against an outgoing seizure while it is in use in an incoming call.

Upon release of relay V, relay B is likewise restored. Relay D is maintained operative for the duration of the seizure signal pulse. Contact 48*b*, which has been closed again, and contact 57*d*, which has not yet been opened, cause relay C to operate, and this relay is maintained energized over its contact 50*c*. Relay C maintains relays T and T1 operated over its contact 26*c*.

Upon operation of relay C, relay R1 is energized over contact 52*c*; by its contact 3*r*1, relay R1 applies 25 cycle ringing current to the line of the called preferred subscriber. This ringing current may be transmitted continuously or intermittently. At the same time, the idle signal FZ is connected over contact 53*r*1 to the repeater U2 and is thence transmitted over the toll line to the calling preferred subscriber.

When the called preferred subscriber lifts his receiver, relay A is operated, either by the D. C. source of ringing current during ringing, or directly from a source of D. C. during intervals between ringing signals. Contacts 13*a* and 14*a* complete the connection of the toll line to the called subscriber, and disconnect the idle signal FZ. Contact 6*a* operates relay A1 which disconnects the ringing relay R1 at contact 51*a*1.

When the called preferred subscriber replaces his receiver at the end of the conversation, the resultant interruption of the subscriber's loop deenergizes relay A. Relay A1 remains operative over contacts 53*c* and 54*a*1. The switch-over apparatus remains seized and the toll line remains connected to the preferred subscribers.

Release of the switch-over apparatuses and switching-back of the toll line will not take place until the calling preferred subscriber replaces his receiver, thereby initiating the transmission of a release signal pulse. The relay A of the switch-over apparatus on the calling side releases and interrupts, at contact 6*a*, the holding circuit for relay A1 so that the latter also releases. At contact 59*a*1 of the latter, the circuit for winding I of relay B is then closed, and this relay in turn operates relay B1 over contact 23*b*. As already described, contact 40*b* causes relay V to be energized for the period during which condenser C2 is discharged. Relay B1 interrupts the circuit of winding I of relay B at contact 58*b*1, but relay B remains energized by its winding II until relay V releases. Transmission of the release pulse, which is of sound frequency, takes place over contacts 33*b*1 and 34*b*1. Relay X is operated over contact 58*b*1. After release of relay V, relay B is deenergized and in turn releases relay B1 by opening contact 23*b*, whereby the transmission of the release pulse is terminated.

Relay E, which had been held operated over contact 16*b* after contact 15*a*1 opened, is deenergized upon release of relay B and releases with some delay. Relay X continues to be held after release of relay B1 until relay E also releases, the holding circuit for relay X including contacts 44*x* and 21*e*.

Opening of contact 22*e* deenergizes relays T and T1, which release with some delay; this switches the toll line back to the toll position and disconnects the busy tone BZ and the busy lamps BL1 and BL2. The switch-over apparatus is ready to be seized anew.

In the switch-over apparatus on the called subscriber's side, the sound frequency receiver TE applies ground potential to the control conductor *i* over contact 41*i* while the release pulse is being received. Just as in a seizure operation, relay B and shortly thereafter relay D are again operated. Once relay D has been energized, relay V can be operated by the charged condenser C3. Relay X is operated over contact 55*d* and continues in operation by means of its holding contact 56*x*. Relay B, whose winding I was disconnected at contact 42*d* upon operation of relay D, is maintained operative by its winding II until relay V releases.

Finally, relays V and B are released. Since relay X is still being held, relay C is now short-circuited over contacts 50*c*, 54*b* and 57*x* and releases. Relay C in turn disconnects relay A1 at contact 53*c*. Relays T and T1 continue to be held operative after release of relay C, the holding contact being 25*d*. When relay D is restored at the end of the release pulse, the holding circuits for relays X, T and T1 are interrupted so that these relays are restored. Release of relays T and T1 switches the toll line back to the toll position, disconnects the busy signal and switches off the busy lamps BL1 and BL2. The switch-over apparatus is then ready to be seized again in either direction.

In the event of failure of the current source BB1 or of a fuse, or upon breakdown of the pre-amplifier, the sound frequency receiver or the sound frequency generator, the normal operations thus far described are no longer possible. The occurrence of such trouble in the switch-over apparatus is automatically indicated in the service unit BS at the toll position. The exchange operator thereupon actuates a key in the service unit and threby conditions the apparatus for emergency operation. Battery BB2 constitutes the source of current supply for this emergency operation.

If the pre-amplifier, the sound frequency receiver or the sound frequency generator in the switch-over apparatus is the cause of the breakdown, it results in opening of contact or contacts *ux* and thus opening of the holding circuit for relay AL. Opening of contact **2*a*1** then opens also the holding circuit for relay S. Both relays are thus restored.

If the trouble is in battery BB1 or in a fuse, relays AL and S are likewise restored.

Figure 3:
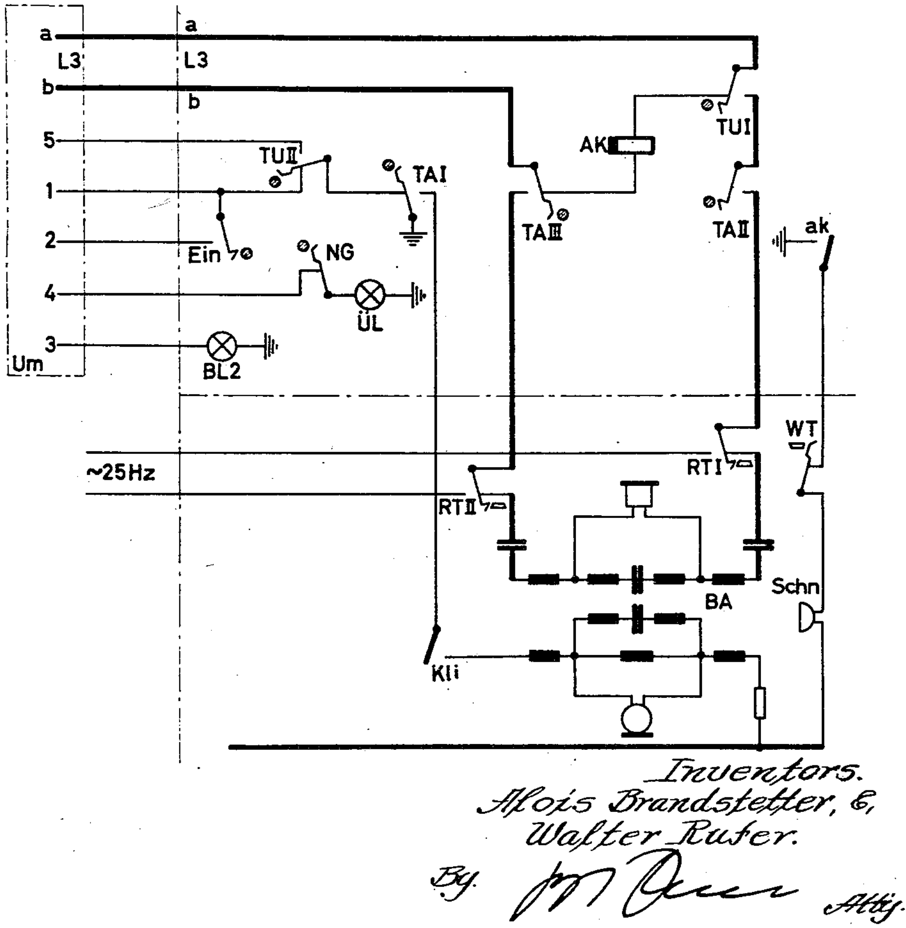
Fig. 3 shows circuit details of the auxiliary service unit associated with the switch-over apparatus of Fig. 2 and located at the exchange operator's position.

A flashing contact **60*f*1** (bottom right of Fig. 2) closes a flashing circuit for control lamp UL in the service unit (Fig. 3). The toll operator thereupon actuates the key TU, which energizes the relay U in the switch-over apparatus U*m* of Fig. 2 in a circuit from ground, key contacts TAII and TUII, conductor 5, relay U to battery BB2. Contacts **29*u*, 30*u* of this relay cause the extension of the toll line to the preferred subscriber. At the same time, busy lamp BL1 at the toll position is connected at contact 72*u*. Control lamp UL is disconnected upon opening of contact 61*u***.

Before actuating the key TU, the toll operator notifies the exchange at the other end of the line that there is trouble in the switch-over apparatus, requiring the extension of the line to the preferred subscribers; the operator at the other end must likewise actuate the key TU and effect the switching-over already described. At the same time, the circuit for relay S is interrupted, and this relay deenergizes. However, since the switch-over apparatus at that end of the line is assumed to be in working order, its relay AL remains energized. In the associated service unit, the control lamp UL is maintained operated over contacts **62*a*1 and 63*s***. As this lamp is of no significance at that end of the line, it may be disconnected by actuation of a switch NG in the service unit.

When the preferred subscriber thereafter lifts his receiver, he actuates relay N over his loop circuit. Contact **66*n*I of the latter connects the busy lamp BL2 in the service unit. No dial tone or other audible signal is transmitted. If the subscriber, having lifted his receiver, then depresses key AT at his station, the closed contact 67*n*** in the switch-over apparatus energizes relay Q. This relay produces an outgoing ring, the length of which depends upon how long the key AT is being held depressed.

Depending upon whether the switch-over to emergency operation has or has not yet been effected at the service unit, the ringing current emanating from the preferred subscriber's station is transmitted either to the toll line or to the service unit at this subscriber's own toll exchange. Ringing may be effected at will either as a 25-cycle ring or as a D. C. ring, depending upon the circuits at the toll position. By way of illustration, there will be described hereinafter, first, a 25-cycle ring to the service unit, and second, a D. C. ring to the toll line.

If the switching-over to emergency operation because of a failure has not yet been carried out, a call by the preferred subscriber causes actuation of the call drop AK in the service unit. Ringing current is applied over contacts **68*q*, 69*q*** in the switch-over apparatus. The actuated call drop in the service unit operates contact *ak* (Fig. 3) and thereby connects an audible signal S*chn* to alert the operator. This insures that the preferred subscriber's call cannot be disregarded in cases of equipment failure. In this case, points 6 and 7 on the one hand, and points 8 and 9 on the other hand, are interconnected (see right-hand center portion of Fig. 2).

In the case of a D. C. ring to the toll line, or more specifically to the ring repeater inserted between the switch-over apparatus and the toll line, negative battery is applied to the *b* conductor of the line during ringing. Negative battery is applied over contact **69*q* of link L3 and contact 30*u*** of link L2 to the *b* conductor of link L1. In this case, points 9 and 10 are interconnected.

In the switch-over apparatus, assumed to be conditioned for emergency operation, at the other end of the toll line, only the relay U and under certain circumstances also the relay AL, are operated. The 25-cycle ring is either transmitted direct to the switch-over apparatus, or if a ring repeater is inserted, a D. C. ring is passed on to this apparatus. In either case, relay R in the apparatus is energized.

If for any reason the apparatus should not have been switched over for emergency operation, the incoming call from the preferred subscriber arrives at the toll position like a normal toll call. At the toll position, the necessary steps are then taken to switch over to the called preferred subscriber. Thus, just as in the case of outgoing calls, a preferred subscriber's call cannot be lost in incoming traffic either.

Relay R remains energized for the duration of ringing and, during this period, connects relay R1 by means of contact **71*r*. Contacts 64*r*1 and 65*r*1 of relay R1 transmit the ringing current to the preferred subscriber. If the called subscriber answers during an interval between rings, relay N will be energized over his loop as already described, and this relay, by opening its contact 70*n*, prevents any further calls from reaching this subscriber. Contact 66*n*I** of the same relay operates busy lamp BL2 in the service unit.

At the end of the conversation, the receiver is replaced. Relay N is thereby restored and disconnects busy lamp BL2. The toll line remains connected for emergency operation until the toll operator switches back to normal operation by returning the key TU to its initial position.

When the trouble has been removed and the switch-over apparatus is fully operative again, this is indicated at the exchange operator's position. Relay AL is again operated and, by its contact **62*a*1, connects control lamp UL in the service unit. The operator then returns the key TU to its normal position. Relay U in the switch-over apparatus is released. This causes the toll line to be connected through to the operator's position and disconnects the busy lamp BL1 at contact 72*u*. Thereupon, the "IN" switch of the service unit is momentarily actuated to energize relay S of the switch-over apparatus; this relay then establishes its own holding circuit by closing its contact 1*s***, and effects the circuit connections described before.

As shown in Fig. 3, the auxiliary service unit (BS in Fig. 1) is equipped with circuit means permitting the operator to converse with the preferred subscriber. This may be desirable, for example, for operational or other reasons, prior to switching-over to the emergency operation.

Actuation of the key TA interrupts the holding circuit for relay S in the switch-over apparatus. The preferred subscriber's line link LT is then switched through to link L3, leading to the service unit, over contacts **4*s* and 5*s***. The operator's hand set BA is connected to link L3 over contacts TAII and TAIII.

Calling of the preferred subscriber from the service unit is effected by depression of ringing key RT; contacts RTI and RTII of this key apply ringing current to link L3. This current energizes relay R in the switch-over apparatus, and this relay in turn connects relay R1 at contact **71*r*. Contacts 64*r*1 and 65*r*1** insure transmission of the ringing current to the preferred subscriber.

This arrangement permitting conversation between the operator and the preferred subscriber may also be employed for the purpose of notifying the subscriber before the switch-over apparatus is switched back from emergency to normal operation.

Figure 2:
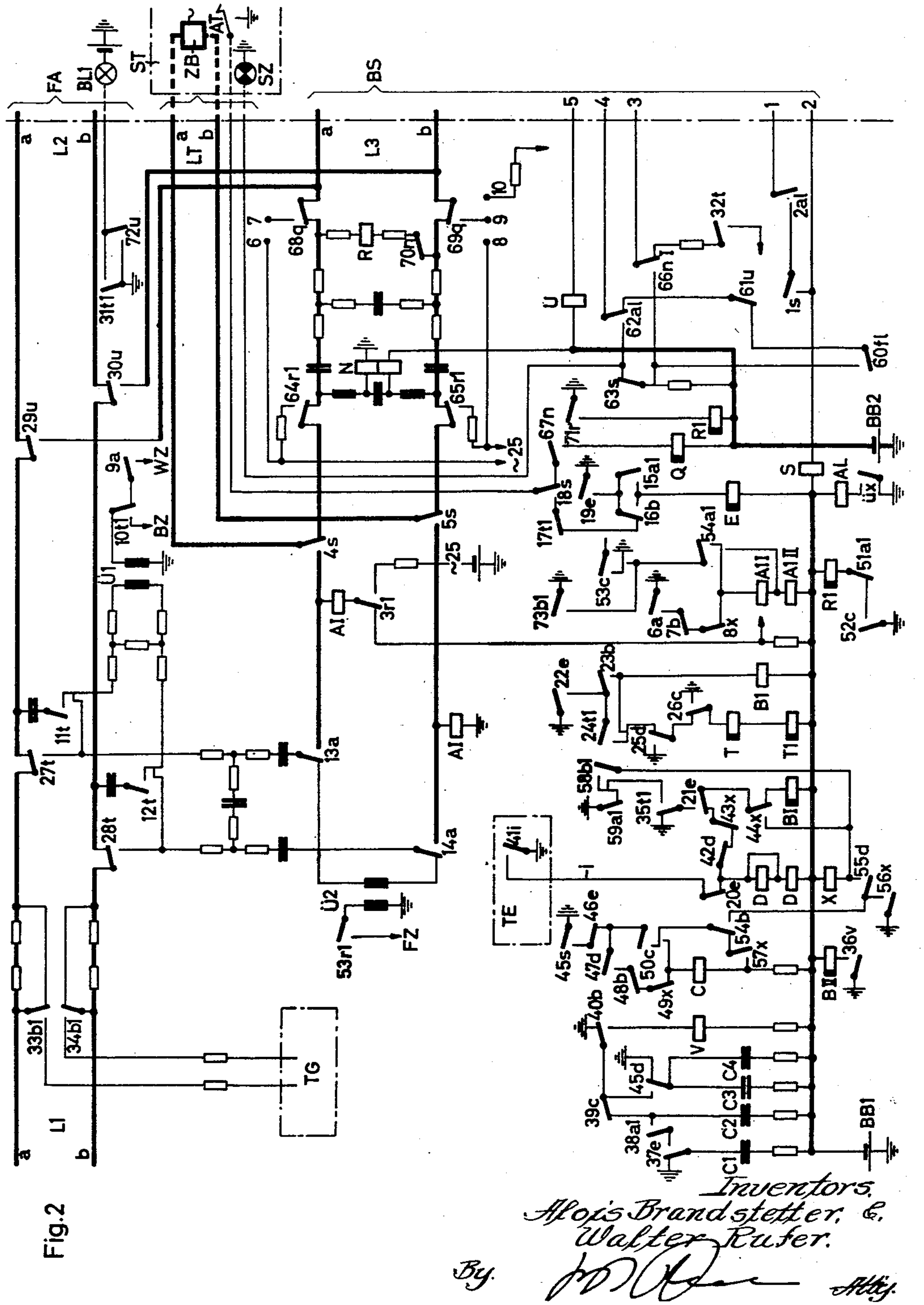
Fig. 2 shows circuit details of the switch-over apparatus illustrated in Fig. 1.

As will be apparent from Fig. 2 (top right-hand corner), the preferred subscriber's station is equipped with a visible signal S1 which is actuated over contact 63*s* in the switch-over apparatus and which indicates to the preferred subscriber the occurrence of a breakdown in the switch-over apparatus, or the switching-over of the circuits to emergency operation.

It will be clear from the foregoing explanations that the manner of using the apparatus by a preferred subscriber is the same for emergency as for normal operation. After lifting the receiver, the subscriber in either case depresses a key which, in normal operation, causes seizure of the two switch-over apparatuses and automatic calling of the preferred subscriber at the other end of the toll line, while in emergency operation it causes this preferred subscriber to be called direct.

Changes may be made within the scope and spirit of the appended claims.

We claim:

1. In a telephone system having normal subscribers and preferred subscribers and having a trunk line for two-way traffic terminating at the opposite ends in operators' positions and having switch-over apparatus at each end thereof for extending such trunk line to a preferred subscriber, actuating means at each preferred subscriber for initiating the operative actuation of the associated switch-over apparatus to extend a call over said trunk line, signal means disposed at each operators' position for indicating to the corresponding operator failure of the respectively associated switch-over apparatus to extend said trunk line to the corresponding preferred subscriber responsive to the operation of said actuating means by such subscriber, means controlled by the operator for switching the corresponding trunk line to such preferred subscriber, control means for connecting a ringing current source to the corresponding preferred subscriber, and means operable responsive to the operation of said actuating means by said preferred subscriber for transmitting ringing current to the called subscriber or to said operator so as to call said operator in the event of failure of said operator to extend said trunk line responsive to the actuation of said signal means.

2. A system and co-operation of elements as set forth in claim 1, comprising means for connecting an emergency current source to supply current to said preferred subscriber incident to connecting said ringing current source thereto.

References Cited in the file of this patent

UNITED STATES PATENTS

| | | |
|---|---|---|
| 2,332,290 | Baumfalk | Oct. 19, 1943 |
| 2,350,193 | Rhoads | May 30, 1944 |
| 2,350,873 | Busch et al. | June 6, 1944 |
| 2,375,678 | Newstedt | May 8, 1945 |